INVENTOR
FRANK S. LAMPARD
ATTORNEYS

Patented July 23, 1935

2,008,960

UNITED STATES PATENT OFFICE 2,008,960

TRANSFER MECHANISM

Frank S. Lampard, Ellwood City, Pa., assignor to Mathews Conveyer Company, Ellwood City, Pa., a corporation of Pennsylvania Application March 20, 1931, Serial No. 524,089

6 Claims. (Cl. 198—24)

This invention relates to new and useful improvements in means for discharging commodities from a conveyer onto a suitable receiving means.

An object of the invention is to provide in combination with a conveyer, a transfer mechanism operating in timed relation therewith and comprising a plurality of members mounted for movement in a direction transversely of the conveyer and also for movement lengthwise thereof, said member being adapted to engage commodities being transported by the conveyer and discharge them therefrom onto a suitable receiving means such, for example, as another conveyer.

A further object is to provide a transfer mechanism adapted to be situated adjacent to a conveyer and comprising an endless chain having a plurality of members supported thereon and adapted for reciprocal movement in a direction transversely to the line of travel of the conveyer, said endless chains traveling at substantially the same rate of speed as that of the conveyer, and said mechanism including means for reciprocating said members whereby they may engage commodities supported upon said conveyer and transfer them onto a suitable receiving means.

Other objects of the invention reside in the particular arrangement of the transfer mechanism in connection with the conveyer; in the construction of the means for supporting the members which engage the commodities and discharge them from the conveyer, in the means for operating said members to cause them to eject commodities from the conveyer; in the means for operating the transfer mechanism in timed relation with the conveyer; and in the means provided for taking up lateral strains imparted to the transfer mechanism as a result of the members engaging and transferring commodities therefrom onto a receiving means.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

Figure 2:
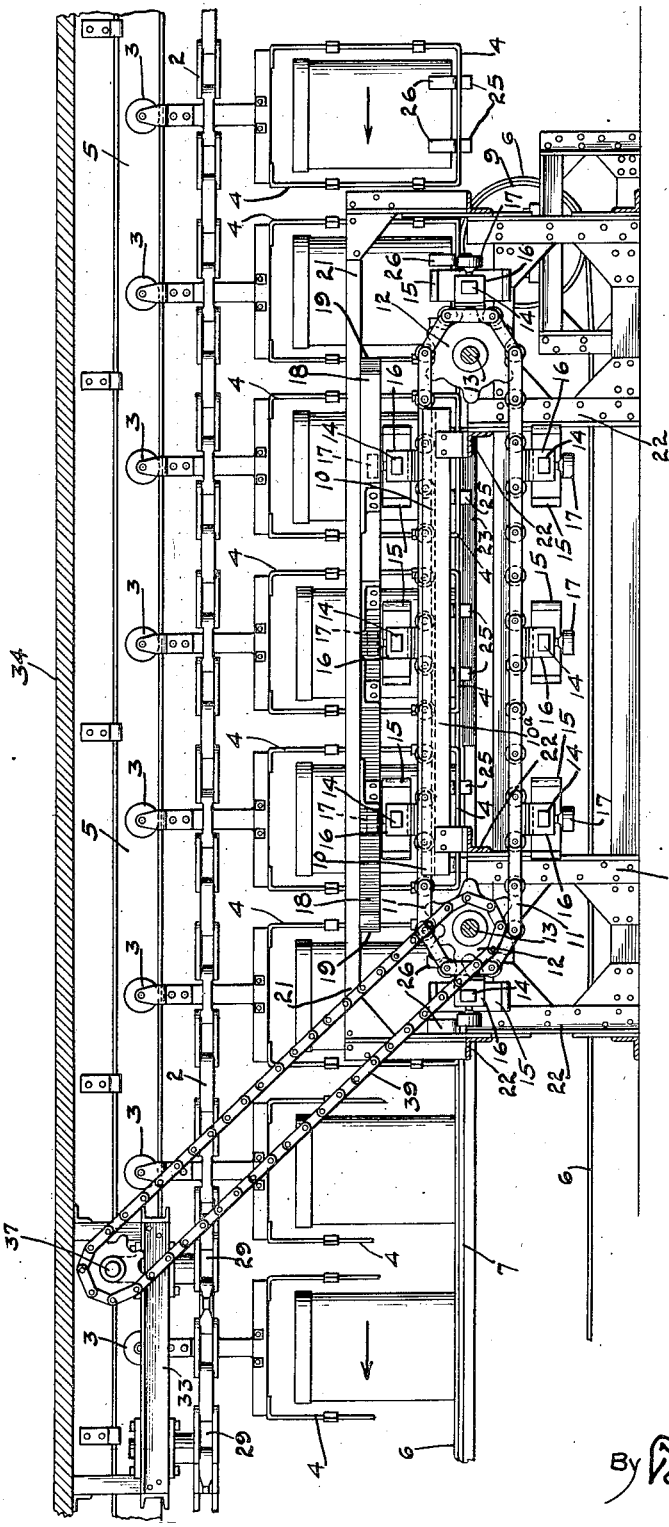
Figure 2 is a sectional view on the line 2—2 of Figure 1.
Figure 3:
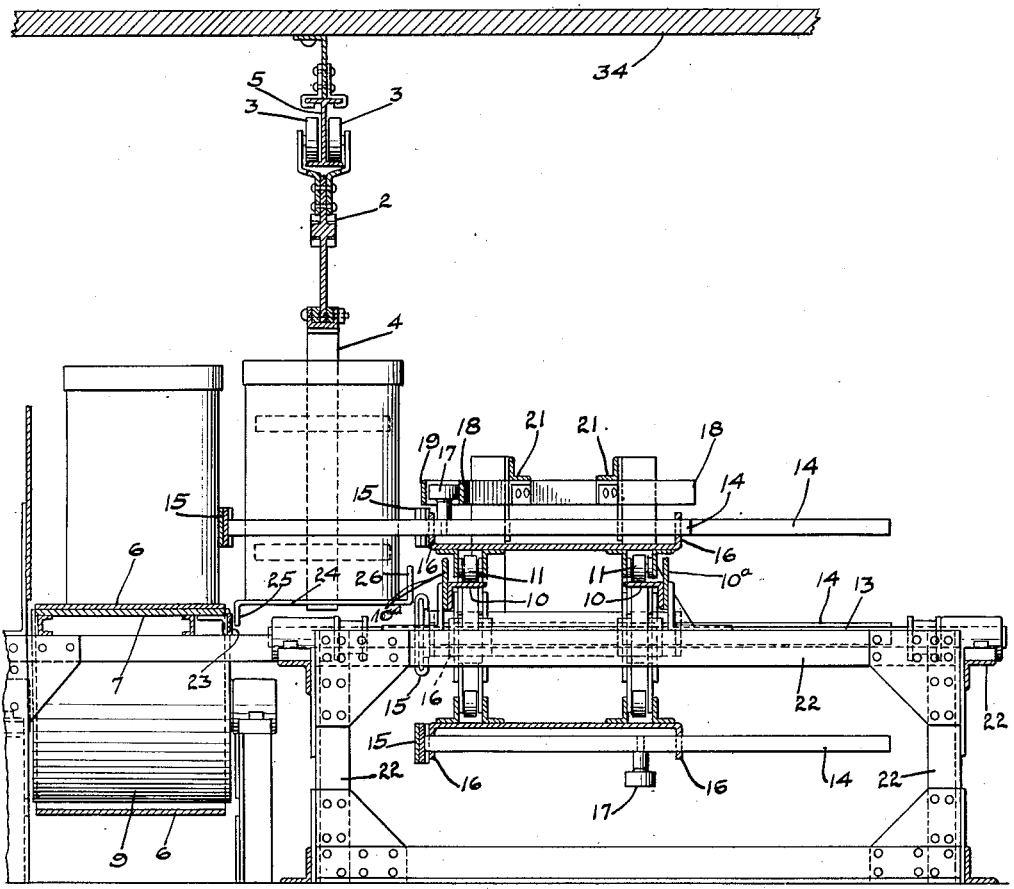
Figure 3 is a cross sectional view on the line 3—3 of Figure 1.

In the selected embodiment of the invention here shown, for purposes of disclosure, there is illustrated in Figures 2 and 3, a conveyer of the trolley type, comprising a drive chain 2 connecting together a plurality of trolleys 3, each provided with a carrier 4 adapted to receive and support a commodity, as shown. The trolleys 3 are supported upon a suitable overhead track 5. The chain 2 provides the driving means for the carriers and is operatively connected with a suitable driving mechanism, not shown in the drawings.

Figure 1:
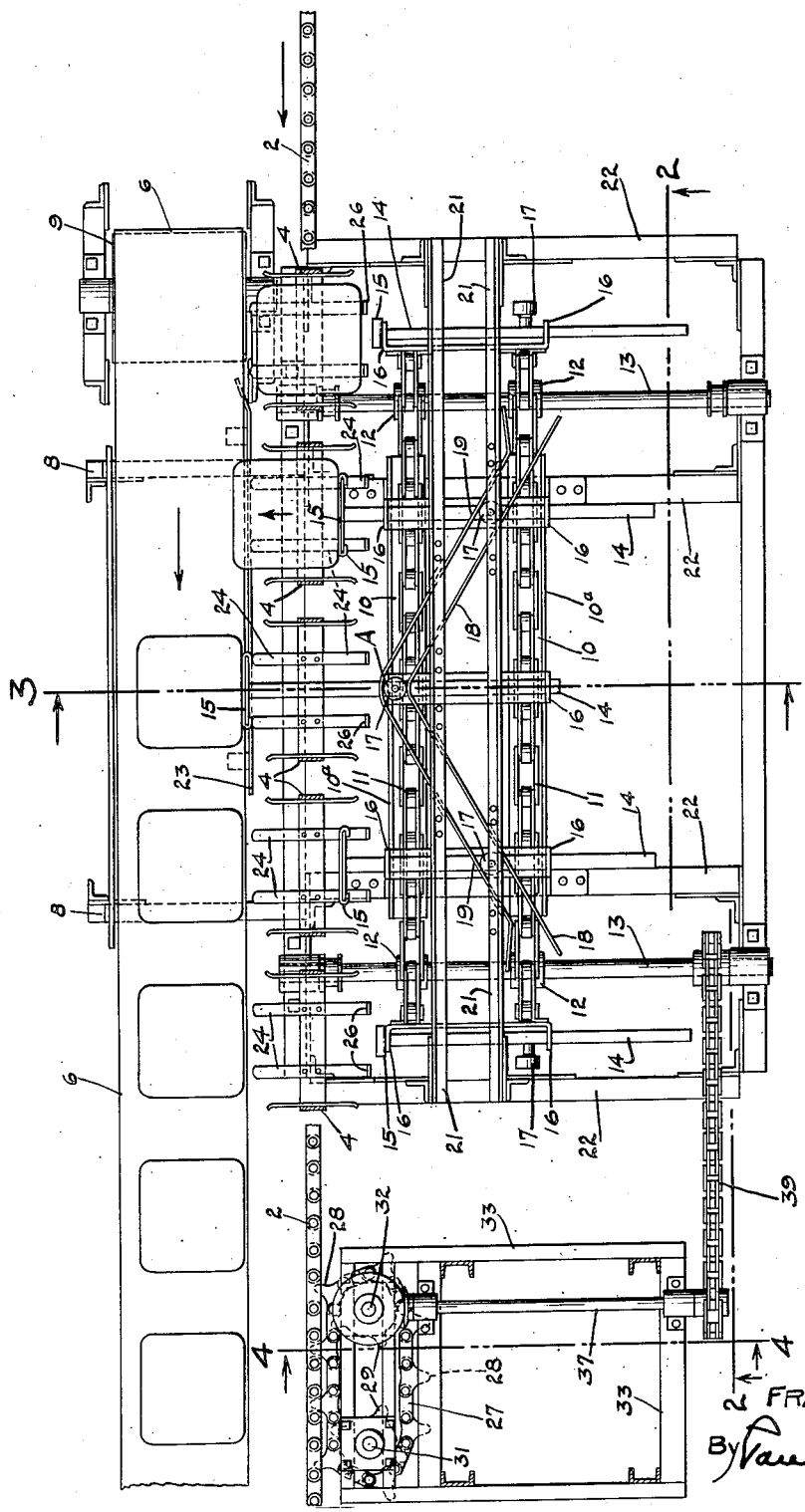
Figure 1 is a plan view, showing the novel transfer mechanism arranged to transfer commodities from one conveyer onto another.

For purposes of illustration, there is shown in Figures 1, 2, and 3, a belt type conveyer including an endless belt 6, the upper run of which is shown supported upon a suitable plate or table 7 supported upon a frame 8. The endless belt 6 is supported at one end upon a suitable roller 9. The conveyer belt 6 and the carriers 4 are shown traveling in the same direction as will be noted by the arrows in Figures 1 and 2.

A feature of this invention resides in the means provided for discharging or transferring commodities from the carriers 4 onto a suitable receiving means such, for example, as the conveyer 6. This transfer mechanism preferably comprises two endless chains 11 arranged in spaced relation, as shown in Figure 1 and supported upon suitable sprockets 12 mounted upon shafts 13. The endless chains 11—11 are arranged in spaced parallel relation to the line of travel of the carriers 4, and they are operated so as to travel at substantially the same speed as the carriers.

A plurality of members 14 each provided with a head 15, are slidably mounted in suitable guides 16 secured to the endless chains 11—11 arranged in spaced relation thereon, as shown in Figure 1. The spacing between the guides 16 is substantially the same as the spacing between centers of the carriers 4 supported upon the trolleys 3. Each member 14 is shown provided with an antifriction roller 17 adapted to travel between a pair of guide rails 18 and 19 fixedly mounted above the chains 11—11. The guide rails 18 and 19 are shown supported upon suitable angle bars 21 mounted upon a suitable frame structure 22 which also provides means for supporting the shafts 13—13 upon which the chains 11—11 are mounted. When the members 14 travel from right to left, as viewed in Figure 1, the roller 17 of each member will engage the inclined guide rail 18, whereupon said members will be moved in a direction towards the carrier 4, and because of the traveling movement of the members 14 being substantially the same as that of the carriers 4, and because of each member being timed so as to be alined with a carrier, the heads of said members will travel in a direction across the line of travel of the carriers, as shown in Figure 1 so that if commodities are supported upon said carriers, they will be discharged or transferred therefrom onto the belt conveyer 6, shown in Figures 1 and 3. When the roller 17 of each member 14 reaches the position shown at A in Figure 1, the member will have reached the end of its travel in one direction and will then be returned to its normal position by the guide rail 19, as will readily be understood by reference to Figure 1. Thus, it will be seen that as the endless chains 11—11 continue to rotate in timed relation with respect to the carriers 4, the heads 15 of the members 14 will be reciprocated across the line of travel of the carriers, whereby commodities being conveyed by the carriers will, as they pass the transfer mechanism, be discharged from the carriers onto the conveyer belt 6, here shown disposed adjacent thereto.

To prevent sagging of the upper runs of the chains 11—11, said chains are provided with suitable anti-friction rollers adapted to travel upon tracks 10—10 suitably supported upon the frame 22. Each track 10 is provided with a guide rail 10a to retain the rollers of the chains 11—11 upon the tracks.

Means are provided for relieving the carriers of lateral strains resulting because of the frictional engagement of the commodities with the bottoms of the carriers, as the commodities are ejected therefrom onto the conveyer 6. Such means is shown in Figures 1 and 3 and may consist of a rail 23 secured to the frame 8, upon which the plate 7 of the conveyer 6 is mounted. In the drawings, the bottom of each carrier is shown comprising a pair of spaced bars 24 having their end portions 25 adjacent to the rail 23 bent downwardly so as to engage the rail 23 when a lateral thrust is exerted against the carrier. The rail 23 thus takes up lateral strains imparted to the carriers. The opposite ends 26 of the bars 24 may be bent upwardly, as shown.

Figure 4:
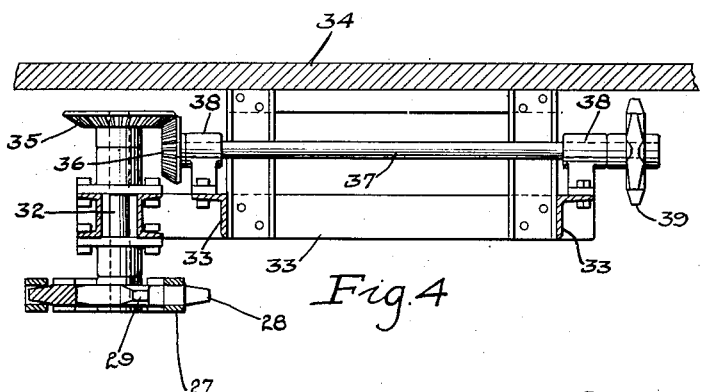
Figure 4 is a detail sectional view on the line 4—4 of Figure 1, showing the driving means for the transfer mechanism.

The means provided for operating the chains 11—11 of the transfer mechanism in timed relation with respect to the travel of the carriers 4, is shown in Figures 1, 2, and 4, and comprises what may be termed a "caterpillar drive." This drive includes an endless chain 27 provided with a plurality of outwardly projecting lugs 28 adapted to engage the links of the drive chain 2 which operates the carriers 4. The caterpillar drive chain 27, being operatively connected with the drive chain 2 of the carriers by means of the lugs 28 is synchronized therewith. The chain 27 is supported upon sprockets 29 mounted upon the shafts 31 and 32 supported in a suitable frame structure 33, here shown secured to the ceiling 34. A bevel gear 35 is secured to the shaft 32 and meshes with a pinion 36 secured to a drive shaft 37 mounted in suitable bearings 38 provided upon the frame 33. A suitable chain drive 39 operatively connects the shaft 37 with the shaft 13 at the left hand side of the transfer mechanism, when viewed as shown in Figure 1. Thus, it will be seen that the chains 11—11 of the transfer mechanism are operatively connected with the drive chain 2 of the carriers 4 in a manner to cause them to operate in timed relation to the carriers 4.

In the drawings, I have shown the carriers designed for handling cans of the general shape shown in Figures 1 and 2, but obviously they may be designed for handling various other types or kinds of commodities without in any way, departing from the scope of the invention. It is also to be understood that the transfer mechanism need not necessarily be used in connection with two conveyers. If desired, the commodities may be transferred from the carriers 4 onto a table or other receiving means, it being necessary, of course, that means be provided for moving the discharged commodities out of the way of following commodities which may be discharged at that point.

I claim as my invention:

1. In combination, a conveyer, an overhead track, a plurality of carriers mounted to travel on said track in spaced relation, a mechanism for transferring articles from said carriers onto said conveyer, said mechanism comprising a plurality of pushers movable in a direction with said carriers, means for actuating said pushers to cause them to engage articles on said carriers and discharge them therefrom onto said conveyer, without interrupting traveling movement of the carriers, and means for resisting lateral movement of the carriers when the articles are discharged therefrom.

2. In combination, a conveyer, an overhead track, a plurality of carriers mounted to travel on said track in spaced relation, a mechanism for transferring articles from said carriers onto said conveyer without interrupting traveling movement of the carriers, said mechanism comprising an endless chain having a plurality of pushers mounted thereon and adapted for movement therewith and in a direction crosswise of said chain, said pushers operating in timed relation to said carriers and adapted to engage and discharge articles therefrom onto said conveyer, a guide rail adjacent to said conveyer, and means on each carrier adapted to cooperate with said rail to resist lateral movement of the carriers, when articles are being discharged therefrom.

3. In combination, a conveyer, an overhead track, a plurality of carriers mounted to travel on said track, and means movable both lengthwise and crosswise of the track for laterally transferring articles from said carriers onto said conveyer.

4. In combination, a conveyer, a track disposed at an elevation above said conveyer, a plurality of carriers mounted to travel on said track in spaced relation, and means movable both lengthwise and crosswise of the track for laterally transferring articles from said carriers onto said conveyer.

5. In combination, a conveyer, a support disposed at one side of the conveyer, a plurality of separate article-carrying members mounted to travel on said support, and a plurality of pushers movable both lengthwise and crosswise of the track for laterally transferring articles from said members onto said conveyer without interrupting traveling movement of said members, said conveyer and support being disposed at different elevations.

6. In combination, a conveyer, a separate conveying means mounted for traveling movement on an overhead track adjacent to said conveyer, said separate conveying means comprising means for supporting articles in spaced relation, and means movable both lengthwise and crosswise of the track for laterally transferring articles therefrom onto said conveyer without interrupting the traveling movements of said conveyer and conveying means.

FRANK S. LAMPARD.